(12) United States Patent
Zhu et al.

(10) Patent No.: US 7,007,086 B2
(45) Date of Patent: Feb. 28, 2006

(54) METHOD AND APPARATUS FOR MEASURING MULTI-CONNECTION PERFORMANCE OF A SERVER

(75) Inventors: Jie Zhu, Fremont, CA (US); Ovid C. Jacob, San Francisco, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 699 days.

(21) Appl. No.: 10/172,198

(22) Filed: Jun. 14, 2002

(65) Prior Publication Data

US 2003/0233448 A1    Dec. 18, 2003

(51) Int. Cl.
*G06F 15/173* (2006.01)

(52) U.S. Cl. ............ 709/224; 709/228; 714/47

(58) Field of Classification Search .......... 709/224, 709/227–228, 203, 248; 714/47; 702/186
See application file for complete search history.

(56) References Cited

U.S. PATENT DOCUMENTS

| | | | | |
|---|---|---|---|---|
| 5,459,837 | A * | 10/1995 | Caccavale | 709/226 |
| 6,446,120 | B1 * | 9/2002 | Dantressangle | 709/224 |
| 6,571,288 | B1 * | 5/2003 | Sarukkai | 709/226 |
| 6,721,686 | B1 * | 4/2004 | Malmskog et al. | 702/186 |
| 6,799,213 | B1 * | 9/2004 | Zhao et al. | 709/224 |
| 6,823,380 | B1 * | 11/2004 | Nace et al. | 709/224 |
| 6,898,556 | B1 * | 5/2005 | Smocha et al. | 702/186 |
| 6,912,572 | B1 * | 6/2005 | Fischer | 709/224 |
| 2003/0088664 | A1 * | 5/2003 | Hannel et al. | 709/224 |
| 2003/0149765 | A1 * | 8/2003 | Hubbard et al. | 709/224 |
| 2003/0204588 | A1 * | 10/2003 | Peebles et al. | 709/224 |
| 2003/0212787 | A1 * | 11/2003 | Qiu et al. | 709/224 |

* cited by examiner

*Primary Examiner*—Abdullahi E. Salad
(74) *Attorney, Agent, or Firm*—Park, Vaughan & Fleming, LLP; Edward J. Grundler

(57) ABSTRACT

One embodiment of the present invention provides a system for measuring multi-connection performance of a network interface card (NIC) within a server. During operation, a client establishes a connection to a receiver within the server. Next, the client remains in a wait state until a multicast message is received from a control computer. Upon receiving this multicast message, the client starts sending data to and receiving data from the receiver within the server. Note that the control computer waits until every client that is to communicate with the server has established a connection to the server before sending the multicast message. In this way, the system ensures that all client and server computer systems begin sending and receiving data simultaneously, thereby allowing the system to more accurately measure multi-connection performance.

21 Claims, 2 Drawing Sheets

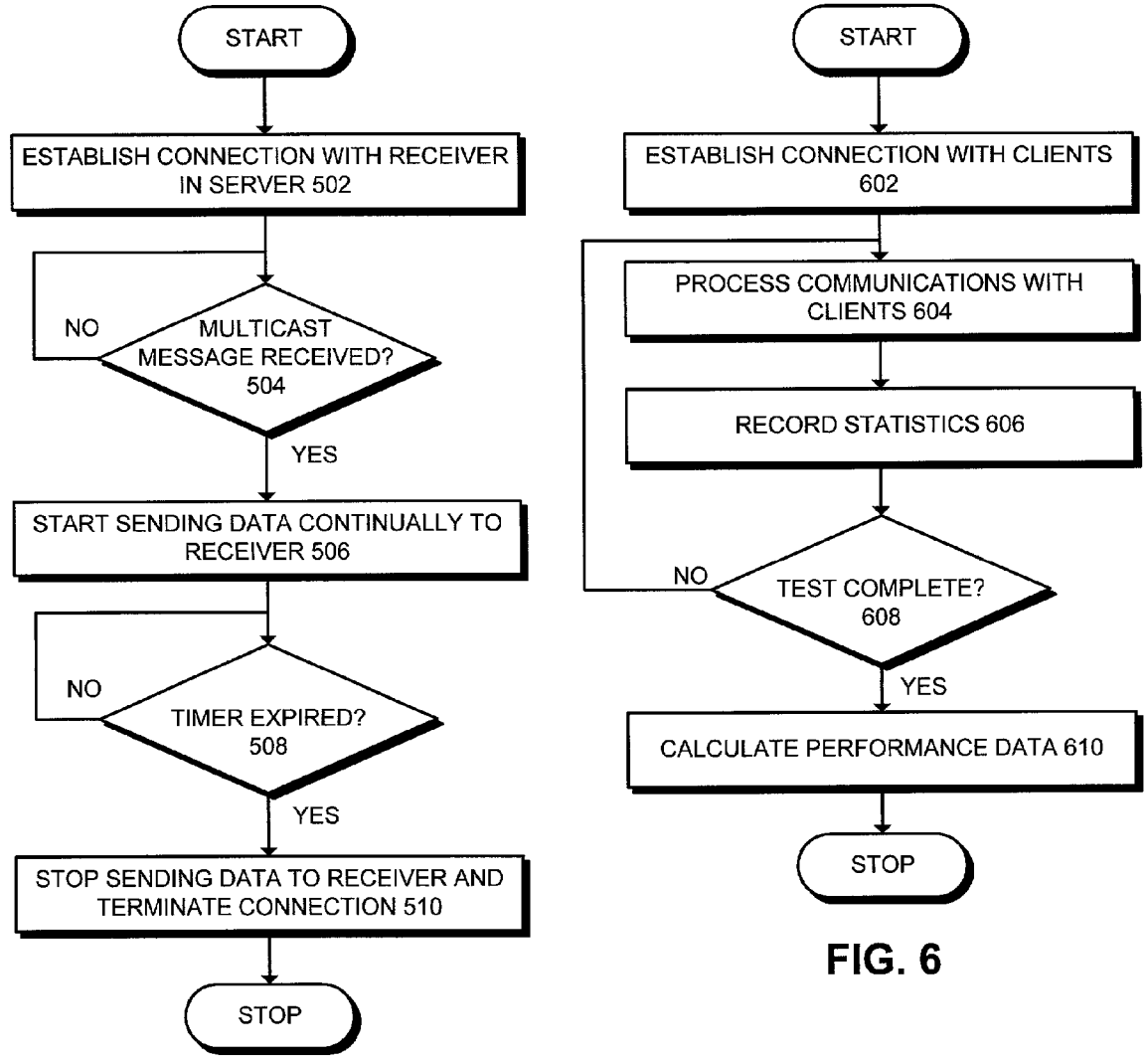

METHOD AND APPARATUS FOR MEASURING MULTI-CONNECTION PERFORMANCE OF A SERVER

BACKGROUND

1. Field of the Invention

The present invention relates to the process of measuring the performance of a server on a network. More specifically, the present invention relates to a method and an apparatus for measuring the performance of a network interface card (NIC) within the server by transmitting data to and from the server through multiple client connections.

2. Related Art

Modern network interface cards (NICs) can provide gigabit-per-second throughput. Unfortunately, measuring the actual throughput of these high-speed NICs to produce proof-of-performance data can be difficult, particularly when the NIC is coupled to a high-speed server. Existing techniques for measuring this throughput, which were developed for much slower devices, are inadequate.

In order to provide sufficient throughput to adequately measure the performance of a high-speed NIC, data must be sent and received to and from multiple clients through multiple network connections to provide sufficient bandwidth to saturate the NIC. This enables the system to measure the maximum throughput of the NIC.

One problem with existing performance measurement techniques is that the clients and the server do not start and stop transmitting data simultaneously, which can significantly skew the measured results.

Another problem with existing performance measurement techniques is that after establishing a first connection, subsequent data traffic through the first connection can interfere with the process of establishing other connections, which may result in some connections never being established. Moreover, each additional connection creates even more data traffic, which further limits the establishment of other connections. Additionally, connections may be completed at a later time causing serialization of the connections.

Serialization of these connections can lead to inaccurate performance measurements. Because of these performance measurement problems, some performance measurements gathered through existing techniques show better throughput when a given NIC is used with a lower performance server than when the same NIC is used with a higher performance server.

What is needed is a method and an apparatus for measuring multi-connection performance of a server without the problems described above.

SUMMARY

One embodiment of the present invention provides a system for measuring multi-connection performance of a network interface card (NIC) within a server. During operation, a client establishes a connection to a receiver within the server. Next, the client remains in a wait state until a multicast message is received from a control computer. Upon receiving this multicast message, the client starts sending data to and receiving data from the receiver within the server. Note that the control computer waits until every client that is to communicate with the server has established a connection to the server before sending the multicast message. In this way, the system ensures that all client and server computer systems begin sending and receiving data simultaneously, thereby allowing the system to more accurately measure multi-connection performance.

In one embodiment of the present invention, the system starts a timer at each client when the client begins sending data. The client subsequently stops sending data when the timer meets a specified time interval.

In one embodiment of the present invention, the total quantity of network traffic between the server and the set of clients sending and receiving data exceeds a maximum bandwidth of the receiver.

In one embodiment of the present invention, the control computer is one of the clients sending data.

In one embodiment of the present invention, the control computer is not one of the clients sending data.

In one embodiment of the present invention, the system measures the quantity of network traffic sent by each client, and uses the measurements to calculate the throughput for each client.

In one embodiment of the present invention, the system combines the measured throughput for each client to calculate the network throughput for the server.

BRIEF DESCRIPTION OF THE FIGURES

FIG. 4 illustrates control computer 116 in accordance with an embodiment of the present invention.

FIG. 5 is a flowchart illustrating the process of a client sending data to a receiver in accordance with an embodiment of the present invention.

FIG. 6 is a flowchart illustrating how a server calculates performance results in accordance with an embodiment of the present invention.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computer Systems

Figure 1:
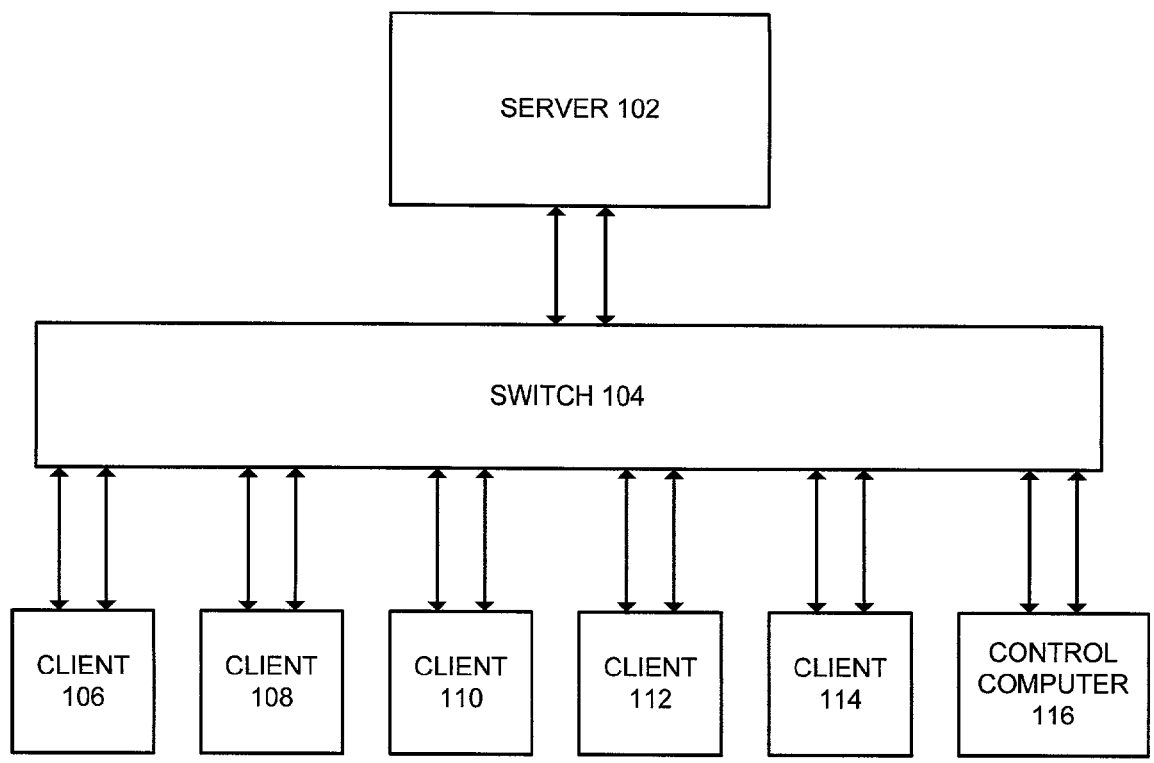
FIG. 1 illustrates computer systems coupled together in accordance with an embodiment of the present invention.

FIG. 1 illustrates a number of computer systems coupled together in accordance with an embodiment of the present invention. The system illustrated in FIG. 1 includes server 102, clients 106, 108, 110, 112, and 114, and control computer 116, which are all coupled together by switch 104. Server 102, clients 106, 108, 110, 112, and 114, and control computer 116 can generally include any type of computer system, including, but not limited to, a computer system based on a microprocessor, a mainframe computer, a digital signal processor, a portable computing device, a personal organizer, a device controller, and a computational engine within an appliance. Furthermore, server 102 can generally include any computational node including a mechanism for servicing requests from a client for computational and/or data storage resources. Switch 104 can generally include any network device with the capability of switching wire speed network traffic between nodes on a network. Note that the system may include more or fewer clients than shown in FIG. 1.

Clients 106, 108, 110, 112, and 114 each establish one or more connections through switch 104 to server 102. After establishing these connections, clients 106, 108, 110, 112, and 114 remain in a wait state until receiving a command to initiate traffic with server 102. Control computer 116 monitors clients 106, 108, 110, 112, and 114 to determine when they have each established the specified connections to clients 106, 108, 110, 112, and 114. When Clients 106, 108, 110, 112, and 114 have each established the specified connections, control computer 116 sends a multicast message to clients 106, 108, 110, 112, and 114 to initiate traffic with server 102. Starting traffic in this manner ensures that each connection has been made and that traffic at each client will start at the same time. Note that control computer 116 may be a process on one of the clients rather than an independent computer.

Server 102

Figure 2:
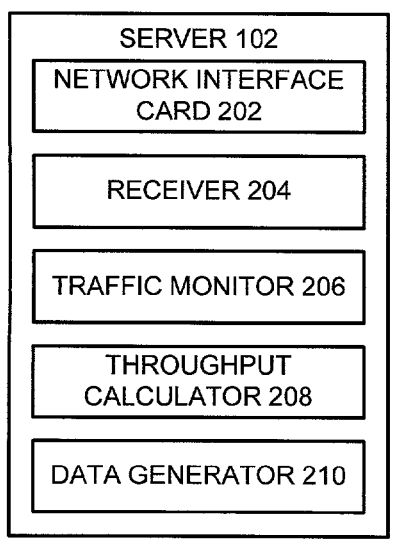
FIG. 2 illustrates server 102 in accordance with an embodiment of the present invention.

FIG. 2 illustrates server 102 in accordance with an embodiment of the present invention. Server 102 includes network interface card (NIC) 202, receiver 204, traffic monitor 206, throughput calculator 208, and data generator 210. NIC 202 provides the physical interface to the network wires coupled to switch 104 and is a limiting device for the network traffic between server 102 and clients 106, 108, 110, 112, and 114.

Receiver 204 establishes and maintains connections to clients 106, 108, 110, 112, and 114 at the request of these clients. Additionally, receiver 204 communicates with clients 106, 108, 110, 112, and 114 over the established connections to provide communication traffic on the network connections. Data generator 210 provides data to send to clients 106, 108, 110, 112, and 114 over the established connections, thereby providing bi-directional communications.

Traffic monitor 206 monitors the bi-directional network traffic between receiver 204 and clients 106, 108, 110, 112, and 114; and between data generator 210 and clients 106, 108, 110, 112, and 114; and records the necessary statistics for calculating the throughput of NIC 202. Throughput calculator 208 calculates the throughput for each individual client and the overall throughput for NIC 202.

Client 110

Figure 3:
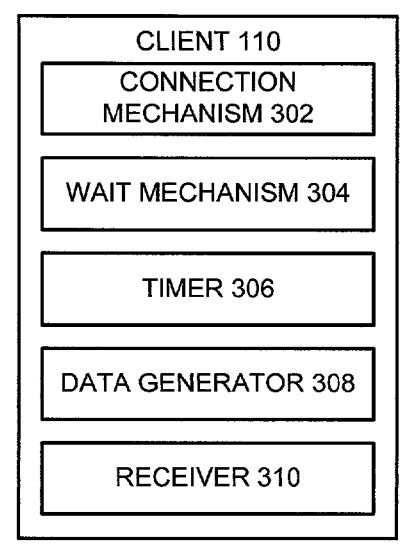
FIG. 3 illustrates client 110 in accordance with an embodiment of the present invention.

FIG. 3 illustrates client 110 in accordance with an embodiment of the present invention. Note that client 110 is representative of clients 106, 108, 112, and 114. Client 110 includes connection mechanism 302, wait mechanism 304, timer 306, data generator 308, and receiver 310. Connection mechanism 302 establishes connections with server 102 through switch 104. After establishing these connections, wait mechanism 304 keeps client 110 in a wait state until receiving a multicast message from control computer 116.

Keeping the servers in a wait state until receiving a multicast message from control computer 116 provides a means to start communication traffic between the clients and the server simultaneously and a means to prevent serialization of communications between the clients and the server. This ensures that each connection has been properly established and that measurements taken during a test are valid.

Upon receiving the multicast message, timer 306 is started and data generator 308 starts traffic with server 102. Receiver 310 receives data traffic from server 102 providing bi-directional data traffic. The traffic continues until timer 306 reaches a specified value. Upon reaching this specified value, timer 306 causes data generator 308 to stop sending data to server 102 and to terminate the connection between client 110 and server 102.

Control Computer 116

FIG. 4 illustrates control computer 116 in accordance with an embodiment of the present invention. Control computer 116 includes client monitor 402 and message multicaster 404. Note that control computer 116 may be a separate computer or a process running on any of clients 106, 108, 110, 112, and 114, or on server 102.

Client monitor 402 monitors the establishment of connections between the several clients and server 102. When each of the clients have established their connections, message multicaster 404 sends a multicast message to the clients so that the clients can simultaneously start network traffic with server 102. These communications can be from the client to the server, from the server to the client, or can be bi-directional Sending Data FIG. 5 is a flowchart illustrating the process of a client sending data to a receiver in accordance with an embodiment of the present invention. The system starts when a client establishes one or more connections with a receiver within the server (step 502). After establishing these connections, the client determines if a multicast message has been received to initiate traffic (step 504). If not, the process remains at step 504 until the multicast message has been received. Note that each client within the system establishes one or more connections and then waits for the multicast message.

When the multicast message is received, the client starts sending data continuously to the receiver in the server (step 506). Note that the traffic may also be bi-directional with traffic originating in the server and being received by the client. The client subsequently monitors the timer while I/O is in progress (step 508) and terminates the I/O and closes the connection when the timer expires (step 510).

Calculating Performance

FIG. 6 is a flowchart illustrating how a server calculates performance results in accordance with an embodiment of the present invention. The system starts when the server establishes connections with the clients (step 602). Next, within a loop, the system processes communications with the clients (step 604) and records statistics concerning each block of data sent to and received from the clients (step 606). Note that the communication may be bi-directional. At the end of the loop, the system determines if the test is complete (step 608). If not, the process returns to step 604 to continue processing data. Otherwise, the system calculates the individual performance data of each client and the overall performance data of the system (step 610).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for measuring multi-connection performance on a network, comprising:
    establishing a connection with a receiver within a server from a client within a plurality of clients;
    causing the client to remain in a wait state after establishing the connection;
    receiving a multicast message from a control computer at the client, the multicast message being sent by the control computer after every client in the plurality of clients has established its connection; and
    upon receiving the multicast message from the control computer at the client, simultaneously initiating network traffic between the plurality of clients and the receiver.

2. The method of claim 1, further comprising:
    starting a timer at each client when network traffic is started; and
    terminating network traffic when the timer meets a specified time interval.

3. The method of claim 1, wherein a total quantity of network traffic between the server and the plurality of clients exceeds a maximum bandwidth of the receiver.

4. The method of claim 1, wherein the control computer is one of the plurality of clients.

5. The method of claim 1, wherein the control computer is independent of the plurality of clients.

6. The method of claim 1, further comprising:
    monitoring a quantity of network traffic with each client in the plurality of clients at the server; and
    calculating a throughput for each client.

7. The method of claim 6, further comprising:
    combining the throughput for each client in the plurality of clients; and
    calculating a network throughput for the server.

8. A computer-readable storage medium storing instructions that when executed by a computer cause the computer to perform a method for measuring multi-connection performance on a network, the method comprising:
    establishing a connection with a receiver within a server from a client within a plurality of clients;
    causing the client to remain in a wait state after establishing the connection;
    receiving a multicast message from a control computer at the client, the multicast message being sent by the control computer after every client in the plurality of clients has established its connection; and
    upon receiving the multicast message from the control computer at the client, simultaneously initiating network traffic between the plurality of clients and the receiver.

9. The computer-readable storage medium of claim 8, the method further comprising:
    starting a timer at each client when network traffic is started; and
    terminating network traffic when the timer meets a specified time interval.

10. The computer-readable storage medium of claim 8, wherein a total quantity of network traffic between the server and the plurality of clients exceeds a maximum bandwidth of the receiver.

11. The computer-readable storage medium of claim 8, wherein the control computer is one of the plurality of clients.

12. The computer-readable storage medium of claim 8, wherein the control computer is independent of the plurality of clients.

13. The computer-readable storage medium of claim 8, the method further comprising:
    monitoring a quantity of network traffic with each client in the plurality of clients at the server; and
    calculating a throughput for each client.

14. The computer-readable storage medium of claim 13, the method further comprising:
    combining the throughput for each client in the plurality of clients; and
    calculating a network throughput for the server.

15. An apparatus for measuring multi-connection performance on a network, comprising:
    a connection establishing mechanism that is configured to establish a connection with a receiver within a server from a client within a plurality of clients;
    a waiting mechanism that is configured to cause the client to remain in a wait state after establishing the connection;
    a receiving mechanism that is configured to receive a multicast message from a control computer at the client, the multicast message being sent by the control computer after every client in the plurality of clients has established its connection; and
    a network traffic initiating mechanism that is configured to simultaneously initiate network traffic between the plurality of clients and the receiver upon receiving the multicast message.

16. The apparatus of claim 15, further comprising:
    a timer within each client that is configured to start when network traffic is started; and
    a terminating mechanism that is configured to terminate network traffic when the timer meets a specified time interval.

17. The apparatus of claim 15, wherein a total quantity of network traffic between the server and the plurality of clients exceeds a maximum bandwidth of the receiver.

18. The apparatus of claim 15, wherein the control computer is one of the plurality of clients.

19. The apparatus of claim 15, wherein the control computer is independent of the plurality of clients.

20. The apparatus of claim 15, further comprising:
    a monitoring mechanism that is configured to monitor a quantity of network traffic with each client in the plurality of clients at the server; and
    a calculating mechanism that is configured to calculate a throughput for each client.

21. The apparatus of claim 20, further comprising:
    a combining mechanism that is configured to combine the throughput for each client in the plurality of clients; and
    wherein the calculating mechanism is further configured to calculate a network throughput for the server.

* * * * *